April 27, 1965
E. V. CALDWELL
3,180,509
SELF-LOADING VEHICLE WITH BODILY SLIDING
AND VERTICALLY SWINGING LOAD SUPPORT
Filed June 21, 1963
2 Sheets-Sheet 1
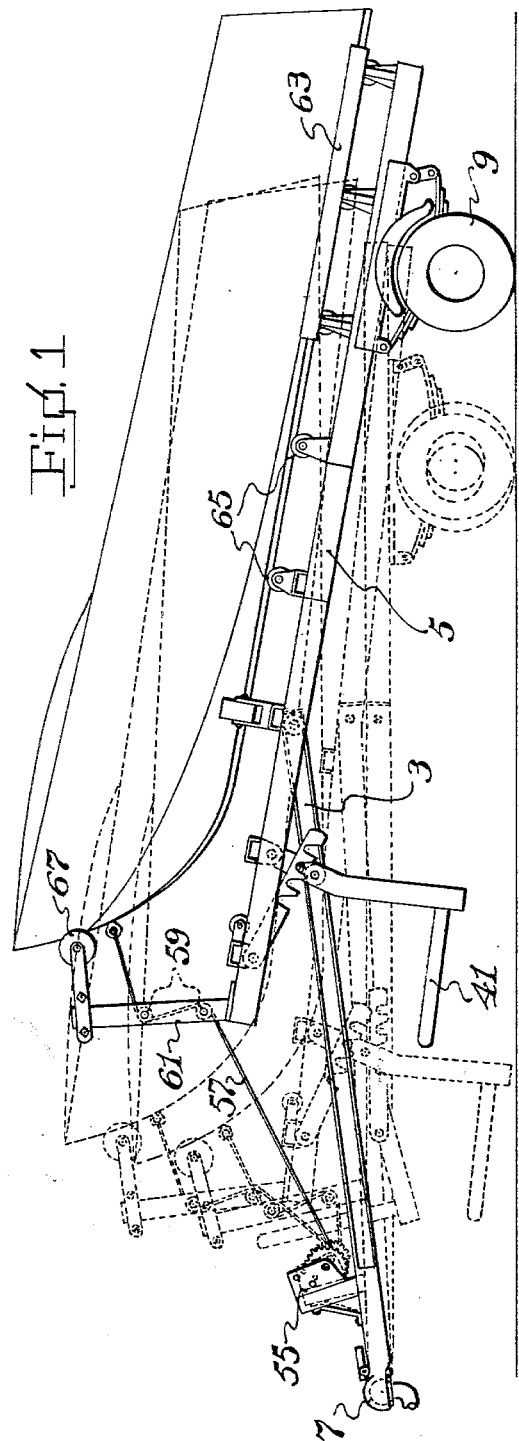
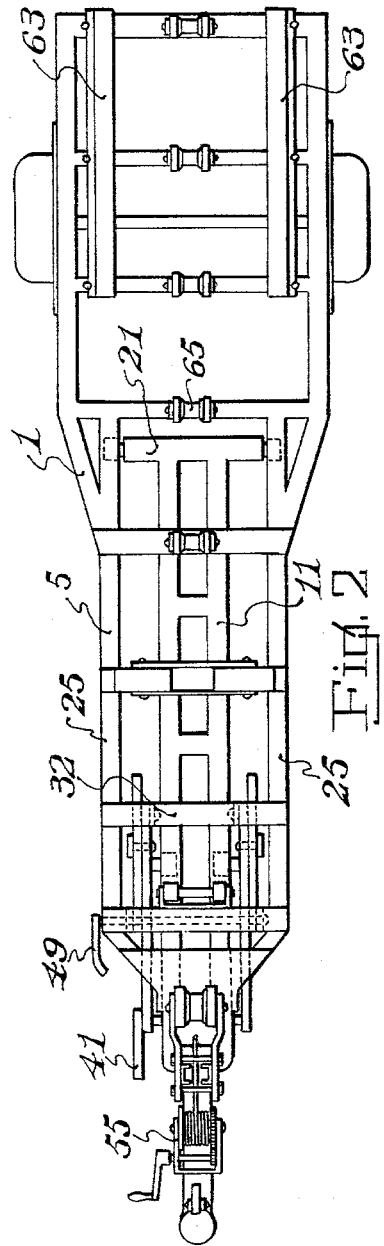
INVENTOR.
Everette V. Caldwell
BY
Robert J. Patch
ATTY.

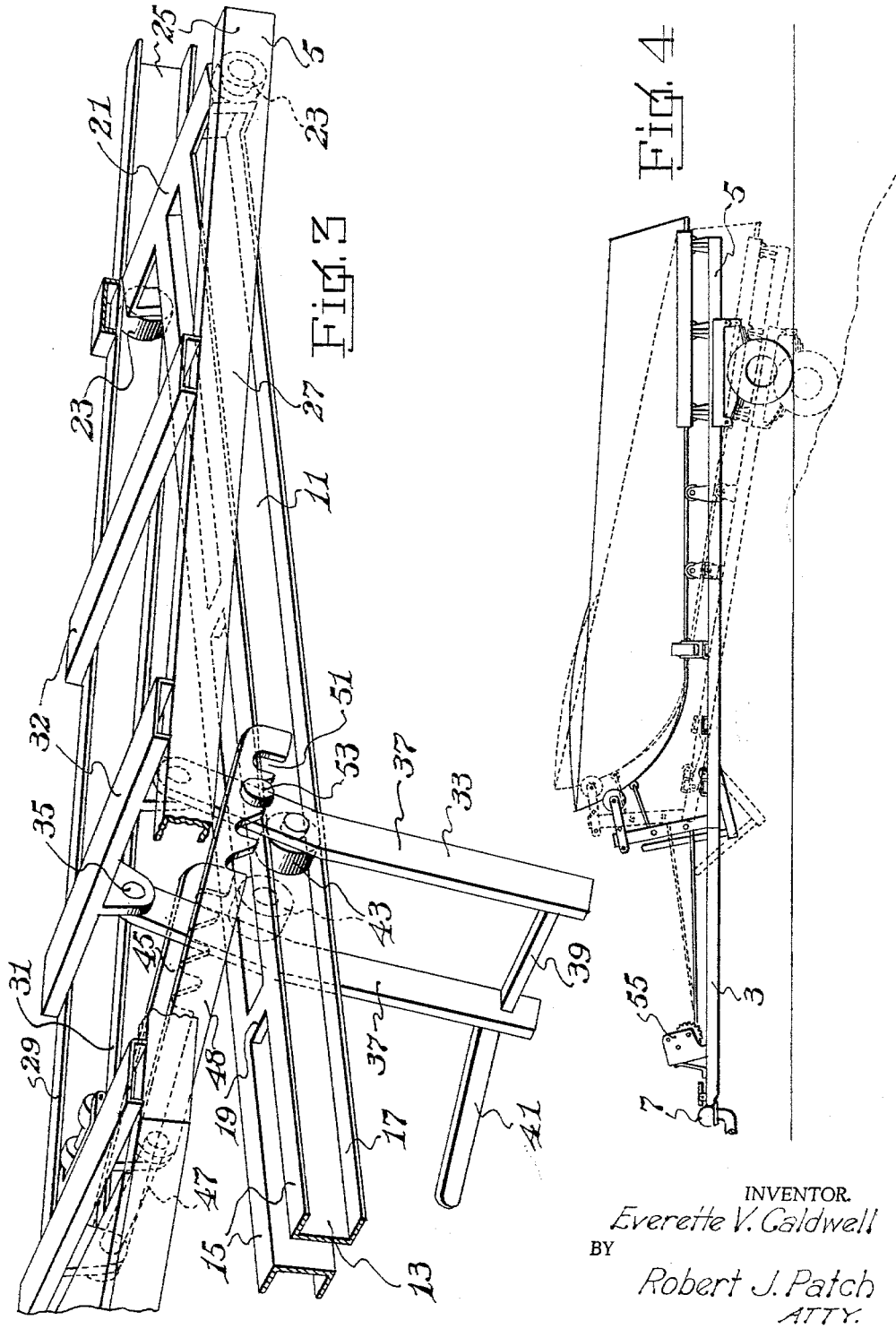

United States Patent Office 3,180,509
Patented Apr. 27, 1965

3,180,509
SELF-LOADING VEHICLE WITH BODILY SLIDING AND VERTICALLY SWINGING LOAD SUPPORT
Everette V. Caldwell, 4145 S. Norfolk Ave., Tulsa, Okla.
Filed June 21, 1963, Ser. No. 289,596
3 Claims. (Cl. 214—505)

The present invention relates to a self-loading vehicle having a bodily sliding and vertically swinging load support. The invention is adapted for use in a plurality of environments but is especially well adapted and will be illustrated in connection with a boat trailer adapted to launch and retrieve a small boat.

An object of the present invention is the provision of such a self-loading vehicle in which the longitudinally slid and vertically swung positions of the load support relative to the vehicle may be precisely controlled at all times.

Another object of the present invention is the provision of such a self-loading vehicle which will be relatively simple and inexpensive to manufacture, easy to operate, and rugged and durable in use.

Other objects and advantages of the present invention will become apparent from a consideration of the following description, taken in connection with the accompanying drawings, in which:

FIGURE 1 is a side elevational view of a self-loading vehicle according to the present invention, showing various operative positions of the apparatus in full and phantom line;

FIGURE 2 is a plan view of the structure of FIGURE 1, with the boat removed;

FIGURE 3 is an enlarged fragmentary perspective view showing the operative relationships of the parts of the present inventions; and FIGURE 4 is a reduced view similar to FIGURE 1 but showing operative positions of the apparatus both on level ground, in full line, and on inclined ground as at the shore of a body of water, in phantom line.

Referring now to the drawings in greater detail, there is shown a self-loading vehicle according to the present invention, comprising a portable chassis 1 adapted to be drawn behind a draft vehicle. Chassis 1 is comprised of an elongated front chassis portion 3 and an elongated rear chassis portion 5 which are articulately interconnected with each other for vertical swinging movement relative to each other and also for longitudinal sliding movement relative to each other. A trailer hitch 7 disposed at the forward end of front chassis portion 3 provides connection for the vehicle as a trailing vehicle behind a draft vehicle such as an automobile or small truck. Wheels 9 carried at the rear of rear chassis portion 5 support the rear end of the vehicle and most of the weight of the vehicle during transit.

Considering front chassis portion 3 in greater detail, it will be seen that it is comprised primarily of a pair of parallel elongated channel members 11 extending lengthwise of chassis 1. The channel members 11 open oppositely away from each other and are comprised of confronting upright webs 13 and oppositely extending horizontal upper and lower legs 15 and 17, respectively. The legs 15 of both channel members 11 are coplanar as are also the legs 17 of both channel members 11. Channel members 11 are rigidly interconnected at spaced points along their length by cross pieces 19 so as to form in effect a rigid framework. At their rear ends, channel members 11 are interconnected by a rear end cross piece 21 of a length substantially greater than the width of the framework comprised by the rest of channel members 11, so that ends of cross piece 21 extend laterally substantial distances beyond the rest of front chassis portion 3. End cross piece 21 carries at its opposite outer ends rollers 23 coaxial on a horizontal axis.

Rear chassis portion 5 is comprised of a pair of spaced parallel generally horizontal longitudinally extending channel members 25, which, however, open toward each other. Thus, channel members 25 are characterized by oppositely disposed upright webs 27 and horizontal coplanar upper legs 29 and horizontal coplanar lower legs 31 which extend toward each other. A plurality of cross pieces 32 extend between and rigidly interconnect channel members 25 of rear chassis portion 5.

Rollers 23 on front chassis portion 3 are disposed in channel members 25 of rear chassis portion 5 and roll between legs 29 and 31 of channel members 25. Chassis portions 3 and 5 are thus articulately interconnected for relative vertical swinging movement and for relative lengthwise sliding movement.

The third principal component of chassis 1 is a rocking frame 33 that is pivotally mounted on an axis indicated at 35 for vertical swinging movement on and relative to one of the cross pieces 32 that interconnect channel members 25 of rear chassis portion 5. Rocking frame 33 is comprised of a pair of generally parallel legs 37 interconnected at their free ends opposite axis 35 by means of a cross piece 39. A handle 41 rigidly mounted on frame 33 adjacent cross piece 39 provides for manual raising and lowering of rocking frame 33. Rollers 43 mounted on a common horizontal axis on portions of legs 37 more closely adjacent axis 35 than cross piece 39 ride in channel members 11 of front chassis portion 3 between the spaced upper and lower legs 15 and 17, respectively, thereof.

A latch frame 45 comprises a shaft 47 mounted for rotation on one of the cross pieces 32 of rear chassis portion 5 and a pair of bars 48 that are parallel to each other and that extend from shaft 47 rearwardly on either side of legs 37 of rocking frame 33. A handle 49 in unitary assembly with shaft 47 provides for swinging latch bars 48 about the horizontal axis of shaft 47. Downwardly opening notches 51 in the underside of latch bars 48 seat selectively over detents 53 that extend outwardly from opposite sides of legs 37 of rocking frame 33, thereby to fix the angular relationships of front and rear chassis portions 3 and 5 and rocking frame 33.

A winch 55 mounted adjacent the forward end of front chassis portion 3 has a rope or cable 57 wound thereabout and thence reeved about pulleys 59 that are mounted on an upright standard 61 disposed adjacent the forward end of rear chassis portion 5. One end of cable 57 is releasably secured to the bow of a boat carried by the apparatus in the illustrated embodiment. Rear chassis portion 5 thus forms a cradle for the transportation or storage of a load such as a boat, which moves up onto the cradle and leaves the cradle by sliding over skidways 63 and rollers 65 and is held in the cradle by cable 57 that draws the load against a bumper roller 67 carried by the upper end of standard 61. The skidways and rollers thus form a slideway for the load.

In operation, the vehicle of the present invention changes in configuration from the phantom line to the full line position shows in FIGURE 1 during the course of an unloading operation. When the vehicle is fully loaded and is used in transport position, the chassis portions 3 and 5 will be substantially coplanar and rocking frame 33 will be in the raised position shown in phantom line toward the left end of FIGURE 1. Cable 57 will be wound up on winch 55 about as far as it will go, so that the parts will be held in that relatively compact position. Of course, auxiliary catches or latches (not shown) can be used to hold the parts in the carrying or traveling position.

When the vehicle reaches the destination at which it is to be unloaded, winch 55 can be released and handle 41 of rocking frame 33 can be depressed toward the phantom line position which is the intermediate position at handle 41 as seen in FIGURE 1. Rocking frame 33 then serves as a lever means acting between the chassis portions to swing them relative to each other, for axis 35 is spaced a substantial distance from the axis of rollers 43. Swinging or rocking movement of frame 33 causes chassis portions 3 and 5 to swing vertically relative to each other. In general, the rear of chassis portion 3 and the front of chassis portion 5 both swing up.

Latch frame 45 can then be swung vertically until latch bars 48 are so positioned that their notches 51 receive detents 53 on rocking frame 33. Thereafter, rocking frame 33 is prevented from swinging clockwise back toward its initial inactive position. Then, chassis portions 3 and 5 can be pulled in opposite directions, either by moving the tractor vehicle forwardly or by pulling rear chassis portion 5 to the rear, until the parts assume the position shown in full line in FIGURE 1. As the parts move toward this position, the angle between chassis portions 3 and 5 progressively changes in a sense such that if the angle between them is considered to be a small acute angle, then that small acute angle increases. Of course, this results in still greater rearward tipping of rear chassis portion 5.

When the parts have reached the full line position of FIGURE 1, the vehicle can either be detached from the tractor vehicle at the point of trailer hitch 7, or it can be left in place on the tractor vehicle by leaving hitch 7 coupled. In the former case, when the vehicle of the present invention is detached, it will be noted that rocking frame 33 extends downwardly and is held fixedly in such a downwardly extended position by the latch frame 45 that the lower end of rocking frame 33 provides feet or supports on which the forward end of rear chassis portion 5 can rest. In that latter position, the weight of the load on rear chassis portion 5 will be nicely distributed between rocking frame 33 and wheels 9. At the same time, however, rear chassis portion 5 will remain tilted to the rear, although of course not to the same extent as if the vehicle of the present invention is left coupled to the tractor vehicle.

In any event, upon releasing winch 55 so that cable 57 can be paid out, the boat or other load on rear chassis portion 5 can move rearwardly along skidways 63 and rollers 65 to launch it into the water or otherwise remove it from the vehicle.

Loading the vehicle of the present invention is of course the reverse operation from unloading it. The parts move from the full to the phantom line positions as shown in FIGURE 1 as the boat is drawn up onto the cradle provided by rear chassis portion 5 by means of winch 55 and cable 57, and then latch frame 45 is disengaged and rocking frame 33 manipulated so as to return the parts to the lowered or traveling position shown in phantom line in FIGURE 1 and characterized by rocking frame 33 being raised.

FIGURE 4 gives a comparison in full and phantom line of several of the positions of the vehicle of the present invention. The full line position shown in FIGURE 4 is a view of the vehicle extended and on level ground, while the phantom line position of FIGURE 4 shows the vehicle extended but so tilted that rear chassis portion 5 permits ready launching of a boat into the water or retrieval of a boat from the water. In the phantom line position of FIGURE 4, it will be apparent that the rear wheels 9 of the present vehicle can move down an incline and into the water to facilitate loading or unloading the carrier.

From a consideration of the foregoing description, therefore, it will be evident that all of the initially recited objects of the present invention have been achieved.

Although the present invention as described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A self-loading vehicle comprising a portable chassis having front and rear chassis portions, means mounting the rear of the front chassis portion for sliding and swinging movement along and relative to the rear chassis portion, extensible means acting between the front and rear chassis portions to pull the rear chassis portion forwardly relative to the front chassis portion, and lever means pivotally secured to a fixed point on the rear chassis portion forwardly of the rear of the front chassis portion, and means mounting a portion of the lever means which is spaced from said fixed point for sliding and swinging movement along and relative to the front chassis portion forwardly of the rear of the front chassis portion.

2. A self-loading vehicle as claimed in claim 1, the last-named means being spaced between the ends of the lever means, the lever means having a portion of substantial length on the side of said last-named means opposite said fixed point whereby said portion of substantial length comprises a ground-engaging support arm.

3. A self-loading vehicle as claimed in claim 1, and latch means pivotally mounted on the rear chassis portion and detachably lockingly engageable with said lever means in any of a plurality of positions of the lever means relative to the rear chassis portion thereby to maintain the front and rear chassis portions at any selected one of a plurality of adjusted angles relative to each other.

References Cited by the Examiner
UNITED STATES PATENTS

| | | | |
|---|---|---|---|
| 2,474,483 | 6/49 | Luttrell | 280—475 X |
| 2,933,332 | 4/60 | Tomkins | 280—475 |
| 2,977,011 | 3/61 | Okerlund | 214—505 |
| 3,082,892 | 3/63 | Cox | 214—84 X |
| 3,102,649 | 9/63 | Whalen | 214—505 |

HUGO O. SCHULZ, *Primary Examiner.*

GERALD M. FORLENZA, *Examiner.*